(12) United States Patent
Odorisio et al.

(10) Patent No.: US 7,138,457 B2
(45) Date of Patent: Nov. 21, 2006

(54) POLYESTER COMPOSITIONS OF LOW RESIDUAL ALDEHYDE CONTENT

(75) Inventors: Paul Angelo Odorisio, Leonia, NJ (US); Stephen Mark Andrews, New Fairfield, CT (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 345 days.

(21) Appl. No.: 10/485,378

(22) PCT Filed: Aug. 6, 2002

(86) PCT No.: PCT/EP02/08762

§ 371 (c)(1),
(2), (4) Date: Jan. 29, 2004

(87) PCT Pub. No.: WO03/016401

PCT Pub. Date: Feb. 27, 2003

(65) Prior Publication Data

US 2004/0176539 A1    Sep. 9, 2004

(51) Int. Cl.
*C08L 67/03*    (2006.01)
(52) U.S. Cl. .................... 525/170; 428/480; 525/176
(58) Field of Classification Search ............... 525/170, 525/176; 428/480
See application file for complete search history.

(56) References Cited

U.S. PATENT DOCUMENTS

| | | | |
|---|---|---|---|
| 4,361,681 A | 11/1982 | Bernhardt | 525/444 |
| 4,394,470 A | 7/1983 | Werner et al. | 524/56 |
| 4,837,115 A | 6/1989 | Igarashi et al. | 428/36.92 |
| 4,873,279 A | 10/1989 | Nelson | 524/384 |
| 5,258,233 A | 11/1993 | Mills et al. | 428/480 |
| 5,266,413 A | 11/1993 | Mills et al. | 428/480 |
| 5,340,884 A | 8/1994 | Mills et al. | 125/420 |
| 5,459,224 A | 10/1995 | Pruett et al. | 528/192 |
| 5,648,032 A | 7/1997 | Nelson et al. | 264/101 |
| 5,650,469 A | 7/1997 | Long et al. | 525/425 |
| 5,656,221 A | 8/1997 | Schumann et al. | 264/85 |
| 5,681,879 A | 10/1997 | Yamamoto et al. | 524/373 |
| 5,856,385 A | 1/1999 | Mehrer et al. | 524/108 |
| 6,013,415 A * | 1/2000 | Sakurai et al. | 430/281.1 |
| 6,191,209 B1 | 2/2001 | Andrews et al. | 524/502 |
| 6,790,499 B1 * | 9/2004 | Andrews et al. | 428/36.92 |
| 6,936,204 B1 * | 8/2005 | Al-Malaika | 264/225 |
| 2003/0032737 A1 * | 2/2003 | Andrews et al. | 525/437 |
| 2005/0176859 A1 * | 8/2005 | Tinkl et al. | 524/111 |

FOREIGN PATENT DOCUMENTS

| | | |
|---|---|---|
| EP | 0191701 | 8/1986 |
| EP | 0714832 | 6/1996 |
| EP | 0826713 | 3/1998 |
| WO | 93/20147 | 10/1993 |
| WO | 93/23474 | 11/1993 |
| WO | 98/07786 | 2/1998 |
| WO | 98/39388 | 9/1998 |

OTHER PUBLICATIONS

Derwent Abstract of JP 04-089829, Tokita et al. Mar. 1992.*
Derwent Abstr. 1986:182855 for JP 60235061 (1985).
Chem. Abstr. 108:151810 for JP 62257959 (1987).

* cited by examiner

*Primary Examiner*—Margaret G. Moore
(74) *Attorney, Agent, or Firm*—Tyler A. Stevenson

(57) ABSTRACT

A mixture of a polyester, such as poly(ethylene terephthalate) PET, and a suitable stabilizer selected from the group consisting of polyhydric alcohol-containing polymers and copolymers derived from 2-propenoic acid ester monomers, when extrusion compounded exhibits a lower residual acetaldehyde content than does PET alone when similarly treated. The invention pertains to any polyester used in the manufacture of bottles or containers which in turn are used to store consumer materials, especially food, beverages and most especially water.

10 Claims, No Drawings

POLYESTER COMPOSITIONS OF LOW RESIDUAL ALDEHYDE CONTENT

A mixture of a polyester, such as poly(ethylene terephthalate) PET, and a suitable compound selected from the group consisting of polymers and copolymers derived from certain 2-propenoic acid ester monomers, when extrusion compounded exhibits a lower residual acetaldehyde content than does PET alone when similarly treated. The invention pertains to any polyester used in the manufacture of bottles or containers which in turn are used to store consumer materials, especially food, beverages and most especially water.

Acetaldehyde is known as a decomposition product of polyesters such as PET. The acetaldehyde imparts an undesirable taste or flavor to bottled water stored in PET bottles. It has been a long sought objective of the industry to reduce the level of acetaldehyde which migrates out of the PET bottle walls into the water or other beverage stored therein. A number of engineering or design changes to extruders, injection molding machines for preforms and bottle making machinery have been made to minimize formation of acetaldehyde when poly (ethylene terephthalate) PET is processed. Modification to the PET composition itself have been made to lower its melting point or its melt viscosity in order to allow less severe thermal or mechanical damage when PET is processed into preforms or bottles.

U.S. Pat. No. 4,361,681 teaches that polyester containing anhydride end-cap agents have a reduced acetaldehyde generation rate.

U.S. Pat. No. 5,459,224 discloses polyesters having 4-oxybenzylidene end-cap agents to impart improved weatherability and photostability, but no mention is made as to evolution of acetaldehyde. However, it is indicated that such polyesters are suitable for food and beverage packaging.

Polyesters can be synthesized by a number of routes known in the art using a variety of catalyst systems. EP-A-0 826 713 teaches that lower levels of acetaldehyde occur during copolymerization of PET when a phosphite such as bis(2,4-di-tert-butylphenyl)pentaerythritol phosphite is present during the polymerization.

U.S. Pat. No. 4,837,115; U.S. Pat. No. 5,258,233; U.S. Pat. No. 5,266,413; U.S. Pat. No. 5,340,884; U.S. Pat. No. 5,650,469; WO-A-93/20147; WO-A-93/23474; WO-A-98/07786 and WO-A-98/39388 teach the use of polyamides as a means of reducing the concentration of acetaldehyde, presumably via a Schiff-base reaction with the aldehyde, which is reversible in the presence of water.

EP-A-0 191 701 describes biaxially oriented containers having excellent barrier properties said container comprising a blend of a poly(ethylene terephthalate) resin and an ethylene-vinyl alcohol copolymer resin. This reference is focused on improved gas barrier properties and is silent as to any reduction of acetaldehyde content.

JP Sho 62-257959 describes biaxially stretched vessels built of synthetic resin consisting of poly(ethylene terephthalate) blended with a copolymer of a polyamide, or blended with ethylene-vinyl alcohol at a weight fraction of 0.1 to 15 percent. The examples are limited to a single EVOH polymer (EVEL G110, Kuraray Co.). It is taught that a lower level of acetaldehyde occurs when the EVOH polymer is present.

EP-A-0 714 832 teaches a method of manufacturing a container comprising poly(ethylene terephthalate), polycarbonate or PEN polyester with an additive in the bottle wall which binds acetaldehyde. The additives is generally described as a polyamide.

U.S. Pat. No. 5,656,221 describes a process of producing polyester with reduced acetaldehyde concentration using certain catalysts or inert gas conditions or by adding an amide compound. These include commercial polyamides or long chain aliphatic amide compounds.

U.S. Pat. No. 5,856,385 teaches the use of polyamide or amide-wax to reduce the level of acetaldehyde which occurs when sorbitol-based clarifying agent is heated in polyolefins.

U.S. Pat. No. 6,191,209 discloses the use of poly(vinyl alcohol) or an ethylene/vinyl alcohol copolymer and polyhydric alcohols, respectively, towards reducing the residual aldehyde content in PET.

U.S. Pat. No. 4,873,279 discloses a composition comprising a copolyester-carbonate resin, a polyester resin, and a minor amount of a mixture of a polyol and at least one epoxide.

U.S. Pat. No. 4,394,470 discloses a polyethylene terephthalate molding composition with a caramel colorant. The caramel colorant may have been formed in situ from a mono- or disaccharide.

U.S. Pat. No. 5,681,879 discloses a flame-retardant polyester composition comprising a polyester resin, a polyhydric alcohol having not less than 3 hydroxyl groups, an inorganic flame retardant and a halogen-based flame retardant.

WO-A-00/66659 discloses molding compositions comprising PET and polyhydric alcohol additives for the reduction of acetaldehyde formation.

WO-A-01/00724 discloses the use of polyols towards reducing acetaldehyde formation in extruded products of PET.

Despite the efforts towards a solution for reducing aldehydic contaminates in PET water bottles, there still remains a need for more effective solutions.

The instant invention is useful for any polyester where aldehydic compounds, especially acetaldehyde, are formed or evolved during thermal processing of said polyester. Thermal processing of PET includes the synthesis of PET, thermal exposure during solid state polymerization (SSP), any injection molding, injection-blow molding or stretch-blow molding used in the manufacture of preforms, parisons, or bottles and containers, or extrusion of film, or during any melt processing of PET above its glass transition temperature and below its decomposition temperature.

The instant invention provides for a lower amount of contaminants (i.e. aldehydes) in PET water bottles thus providing for improved taste or flavor in bottled water or other bottled beverages in said PET containers. The reduction in the amount of acetaldehyde is highly beneficial in this respect.

Further, the compositions of the present invention impart no unacceptable color or haze to PET bottles. "Haze" is an undesirable, perceptible graying effect.

Further, the compositions of the present invention have high thermal stability which is desirable for high temperature melt processing.

Further, compositions of the present invention provide for a lower amount of aldehydes in PET water bottles without imparting any additional contaminants.

The instant invention pertains to a polyester composition, stabilized against the formation of aldehydic contaminants during melt processing of said composition, which comprises (a) a polyester, and
(b) an effective stabilizing amount of at least one polymer or copolymer derived from at least one 2-propenoic acid ester monomer of the formula I

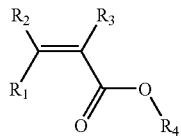

where $R_1$, $R_2$ and $R_3$ are independently hydrogen, straight or branched chain alkyl of 1 to 24 carbon atoms, cycloalkyl of 5 to 12 carbon atoms, aralkyl of 7 to 15 carbon atoms, or said alkyl, cycloalkyl or aralkyl which is further substituted by one or more f—$OR_5$, —$NR_6R_7$, —$CO_2R_8$ or —$CONR_9R_{10}$ wherein $R_5$, $R_6$, $R_7$, $R_8$, $R_9$, and $R_{10}$ are independently hydrogen or straight or branched chain alkyl of 1 to 18 carbon atoms; or $R_1$, $R_2$, $R_3$ are independently a group —$CO_2R_4$,
$R_4$ is a polyhydric alcohol substituent of the formula —E—(OH)$_n$ where
n is 2 to 4000, and
E is a hydrocarbylene moiety.

When $R_1$ is a group —$CO_2R_4$ the monomers are maleic acid derivatives, when $R_2$ is such a group then the monomers are fumaric acid derivatives and when $R_3$ is such a group then the monomers are 2-methylene malonic acid derivatives.

When $R_1$, $R_2$ and $R_3$ are independently alkyl, cycloalkyl or aralkyl which is further substituted by one or more —$OR_5$, —$NR_6R_7$, —$CO_2R_8$ or —$CONR_9R_{10}$ groups, they are for example substituted by 1, 2 or 3 such groups.

The polymer or copolymer of component (b) is for example a poly(glyceryl methacrylate). Poly(glyceryl methacrylate), or 2-propenoic acid, 2-methyl-, 2,3-dihydroxypropyl ester, homopolymer has CAS registry number 28474-30-8.

The polymers and copolymers of component (b) are polyhydric alcohol-containing polymers and copolymers.

The polymer or copolymer of component (b) may be an oligomer or co-oligomer. The repeating units of the polymer, copolymer (or oligomer or co-oligomer) of component (b) have about as few as 2 repeating units and as many as about 10,000 repeating units.

Examples of co-monomers which can co-polymerize with the 2-propenoic acid esters of this invention are ethylenically unsaturated monomers like but not limited to 2-hydroxyethylmethacrylate, 2-hydroxypropylmethacrylate, methacrylamide, styrene and methylmethacrylate.

Accordingly, component (b) is at least one polymer or copolymer selected from the group consisting of poly(glyceryl methacrylate) homopolymer and copolymers of 2-propenoic acid, 2-methyl-, 2,3-dihydroxypropyl ester with one or more other ethylenically unsaturated monomers.

A component (b) of special interest is poly(glyceryl methacrylate) homopolymer.

The instant invention pertains also the new co-polymer of glycerol mono-methacrylate and styrene.

Alkyl is branched or unbranched alkyl, for example methyl, ethyl, propyl, isopropyl, n-butyl, sec-butyl, isobutyl, t-butyl, 2-ethylbutyl, n-pentyl, isopentyl, 1-methylpentyl, 1,3-dimethylbutyl, n-hexyl, 1-methylhexyl, n-heptyl, iso-heptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl or octadecyl.

Cycloalkyl is for example cyclobutyl, cyclopentyl, cycloheptyl, cyclooctyl, cyclononyl, cyclodecyl, cycloundecyl, cyclodocecyl and cyclohexyl.

A hydrocarbylene moiety according to this invention is a divalent group derived from for example an aliphatic, cycloaliphatic, aromatic or a mono-, di- or poly-saccharride moiety.

The hydrocarbylene moieties for the definition of E may be interrupted by heteroatoms, for example by —O—.

The hydrocarbylene moiety E is derived for example from glycerin,1,2,3-butanetriol, 1,2,4-butanetriol, erythritol, ribitol, xylitol, dulcitol, sorbitol, 1,2,3-cyclohexatriol, inositol, glucose, galactose, mannose, galacturonic acid, xylose, glucosamine, galactosamine, 1,1,2,2-tetramethyloylcyclohexane, 1,1,1-trimethylolpropane, 1,1,2-trimethyloylpropane, 1,1,1-trimethylolbutane, 1,1,2-trimethylolbutane, 1,1,1-trimethylolpentane, 1,1,2-trimethylolpentane, 1,2,2-trimethylolpentane, trimethylolpentane, pentaerythritol, dipentaerythritol, 1,1,3,3-tetrahydroxypropane, 1,1,5,5-tetrahydroxypentane, 2,2,6,6-tetrakis(hydroxymethyl) cyclohexane and 2,2,6,6-tetrakis(hydroxymethyl) cyclohexanol.

The hydrocarbylene moiety E is derived for example from starch, cellulose or a sugar or a sugar alcohol; for example degraded starch (dextrins and cyclodextrins), maltose and its derivatives, maltitol, maltopentaose hydrate, maltoheptaose, maltotetraose, maltulose monohydrate, D,L-glucose, dextrose, sucrose and D-mannitol; as well as from commercial polyhydric alcohols which include trimethylol propane, trimethylol propane, glycerol, sorbitol and pentaerythritol.

Preferably, the polyester of component (a) is 95–99.99% by weight and the stabilizer or stabilizers of component (b), in total, are 5 to 0.01% by weight, based on the total weight of (a) and (b).

Also preferably, component (a) is 98–99.99% by weight and component (b) is 2 to 0.01% by weight of the total of (a) and (b); most preferably component (a) is 99 to 99.97% by weight and component (b) is 1 to 0.03% by weight, based on the total weight of (a) and (b).

The additives of component (b) may be added to the polyester of component (a) by known techniques. For example, the additives of component (b) may be added neat or as a solution or dispersion, with or without subsequent evaporation of the solvent. Component (b) may also be added to the polyester to be stabilized in the form of a masterbatch which contains component (b) in a concentration of, for example, about 2.5% to about 95% by weight.

The polyester of component (a) has dicarboxylic acid repeat units selected from the group consisting of aromatic dicarboxylic acids having 8 to 14 carbon atoms, aliphatic dicarboxylic acids having 4 to 12 carbon atoms, cycloaliphatic dicarboxylic acids having 8 to 12 carbon atoms, and mixtures thereof.

Preferably such diacids are terephthalic acid, isophthalic acid, o-phthalic acid, naphthalene dicarboxylic acid, cyclohexane dicarboxylic acid, cyclohexanediacetic acid, diphenyl-4,4'-dicarboxylic acid, succinic acid, maleic acid, glutaric acid, adipic acid, sebacic acid and mixtures thereof.

Especially preferred are terephthalic acid, isophthalic acid and 2,6-naphthalene dicarboxylic acid.

The diol or glycol portion of the polyester of component (a) are derived from the generic formula HO—R—OH where R is an aliphatic, cycloaliphatic or aromatic moiety of 2 to 18 carbon atoms.

Preferably such diols or glycols are ethylene glycol, diethylene glycol, triethylene glycol, propane-1,3-diol, propane-1,2-diol, butane-1,4-diol, pentane-1,5-diol, hexane-1, 6-diol, 1,4-cyclohexanedimethanol, 3-methylpentane-2,4-diol, 2-methylpentane-1,4-diol, 2,2-diethylpropane-1,3-diol, 1,4-di-(hydroxyethoxy)benzene, 2,2-bis(4-hydroxycyclohexyl)-propane, 2,4-dihydroxy-1,1,3,3-tetramethylcyclobutane, 2,2-bis-(3-hydroxyethoxyphenyl)propane, 2,2-bis-(4-hydroxypropoxyphenyl)ethane and mixtures thereof.

Most preferably, the diol is ethylene glycol and 1,4-cyclohexanedimethanol.

The polyester of component (a) is preferably poly(ethylene terephthalate) PET or poly(ethylene 2,6-naphthalene-2, 6-dicarboxylate); most preferably poly(ethylene terephthalate).

It is also contemplated that the polyester of component (a) can also be a blend of polyesters or copolyesters including components mentioned above.

It is contemplated that the polyester of component (a) can be virgin polymer or alternatively polymer recyclate. Additionally, it is possible to add the stabilizer or stabilizers described for component (b) as part of a concentrate with a polyester carrier resin.

The novel polyester compositions provided by this invention are useful in the manufacture of containers or packages for comestibles such as beverages and food. Articles molded from these polyesters exhibit good thin-wall rigidity, excellent clarity and good barrier properties with respect to moisture and atmospheric gases, particularly carbon dioxide and oxygen.

The PET compositions of this invention are especially useful for water bottles. PET compositions for water bottles are prepared from bottle grade PET resin of intrinsic viscosity greater than 0.3 dl/g, more specifically between 0.55 and 0.9 dl/g.

The plastic containers and films of the present invention are rigid or flexible mono- and/or multi-layered constructions. Typical multi-layer constructions have two or more layer laminates, manufactured either by thermoforming, or extrusion of multi-layer flexible films, or extrusion of bottle "preforms" or "parissons" followed by subsequent blow molding of the preforms into bottles. In a multi-layer system, layers of any suitable plastic may be employed.

Multi-layered containers and films of this invention may for example, be formed from layers of polyesters, polyolefins, polyolefin copolymers such as ethylene-vinyl acetate, polystyrene, poly(vinyl chloride), poly(vinylidene chloride), polyamides, cellulosics, polycarbonates, ethylene-vinyl alcohol, poly(vinyl alcohol), styrene-acrylonitrile and ionomers, with the proviso that at least one layer comprises a polyester composition of the present invention.

For both films and rigid packaging (bottles), typically the exterior layer, and innermost layer contacting the contents, are composed of polyesters such as PET or PEN [poly (ethylene naphthalate)], polypropylene, or polyethylene such as HDPE. The middle layers, often called 'barrier' or 'adhesive' or 'tie' layers, are composed of one or more combinations of either PET, PEN, carboxylated polyethylene ionomer such as Surlyn®, vinyl alcohol homopolymers or copolymers such as poly(vinyl alcohol), partially hydrolyzed poly(vinyl acetate), poly(ethylene-co-vinyl alcohol) such as EVOH or EVAL, nylons or polyamides such as Selar® (DuPont) or polyamides based on metaxylenediamine (sometimes called nylon MXD-6), or polyvinylidene chloride (PVDC), or polyurethanes.

Accordingly, the present invention also pertains to a mono- or multi-layered plastic container or film, stabilized against the formation of aldehydic contaminants during melt processing of said container or film, comprising at least one layer which comprises
(a) a polyester, and
(b) an effective stabilizing amount of at least one polymer or copolymer derived from at least one 2-propenoic acid ester monomer of the formula I

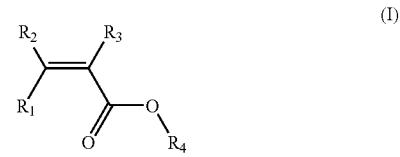

where $R_1$, $R_2$ and $R_3$ are independently hydrogen, straight or branched chain alkyl of 1 to 24 carbon atoms, cycloalkyl of 5 to 12 carbon atoms, aralkyl of 7 to 15 carbon atoms, or said alkyl, cycloalkyl or aralkyl which is further substituted by one or more —$OR_5$, —$NR_6R_7$, —$CO_2R_8$ or —$CONR_9R_{10}$ wherein $R_5$, $R_6$, $R_7$, $R_8$, $R_9$, and $R_{10}$ are independently hydrogen or straight or branched chain alkyl of 1 to 18 carbon atoms; or $R_1$, $R_2$, $R_3$ are independently a group —$CO_2R_4$,
$R_4$ is a polyhydric alcohol substituent of the formula —E—(OH)$_n$ where
n is 2 to 4000, and
E is a hydrocarbylene moiety.

Preferably, the plastic container is a rigid bottle.

Rigid containers may be manufactured by known mechanical processes:
a) Single-stage blow molding such as performed on Nissei, Aoki, or Uniloy machines,
b) Two-stage, injection molding of pre-forms such as on Netstal or Husky machines, and pre-forms converted to bottles by blow molding (e.g., on Sidel, Corpoplast and Krones machines),
c) Integrated blow molding of pre-forms to bottles, such as processes conducted on Sipa, Krupp Kautex, or Husky ISB machines, and
d) Stretch blow molding (SBM) of pre-forms to bottles.

The pre-forms may be mono-layer or multi-layer in construction. The bottles may optionally be post-treated to alter the inner wall properties. Bottles may optionally be surface treated on the exterior such as by application of surface coatings. UV absorbers and other known stabilizers may be present in such added surface coatings.

By the use of known heat-setting techniques, certain of the polyesters are, in terms of color, I.V. and heat distortion, stable at temperatures up to about 100° C. Such stability characteristics are referred to herein as "hot-fill" stability. The linear polyesters most preferred for use in articles having "hot-fill" stability comprise poly(ethylene terephthalate), poly(ethylene terephthalate) wherein up to 5 mole percent of the ethylene glycol residues have been replaced with residues derived from 1,4-cyclohexanedimethanol and poly(ethylene 2,6-naphthalenedicarboxylate), wherein the polyesters have been sufficiently heat set and oriented by methods well known in the art to give a desired degree of crystallinity.

The instant invention also pertains to a process for preventing the formation of aldehydic contaminants during melt processing of a polyester which comprises incorporating into said polyester an effective stabilizing amount of at least one polymer or copolymer derived from at least one 2-propenoic acid ester monomer of the formula I

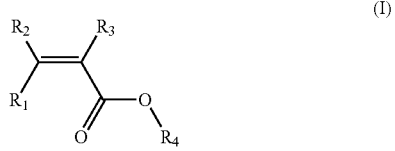

where $R_1$, $R_2$ and $R_3$ are independently hydrogen, straight or branched chain alkyl of 1 to 24 carbon atoms, cycloalkyl of 5 to 12 carbon atoms, aralkyl of 7 to 15 carbon atoms, or said alkyl, cycloalkyl or aralkyl which is further substituted by one or more —$OR_5$, —$NR_6R_7$, —$CO_2R_8$ or —$CONR_9R_{10}$ wherein $R_5$, $R_6$, $R_7$, $R_8$, $R_9$, and $R_{10}$ are independently hydrogen or straight or branched chain alkyl of 1 to 18 carbon atoms; or $R_1$, $R_2$, $R_3$ are independently a group —$CO_2R_4$, $R_4$ is a polyhydric alcohol substituent of the formula —E—$(OH)_n$ where n is 2 to 4000, and E is a hydrocarbylene moiety.

The instant invention also pertains to a process for forming a bottle preform or a PET bottle or container suitable for storing water (mineral, natural, ozonated) or other foodstuffs, which allows the desirable taste of the water or foodstuff after packaging to remain unaltered after being placed in said bottle or container prepared from the polyester composition of the instant invention.

The instant plastic container or film stabilized by a compound or compounds of component (b) may also optionally have incorporated therein or applied thereto from about 0.01 to about 10% by weight; preferably from about 0.025 to about 5% by weight, and most preferably from about 0.1 to about 3% by weight, based on the total weight of the composition, of additional coadditives such as antioxidants, other UV absorbers, hindered amines, phosphites or phosphonites, benzofuran-2-ones, thiosynergists, polyamide stabilizers, metal stearates, nucleating agents, fillers, reinforcing agents, lubricants, emulsifiers, dyes, pigments, optical brighteners, flame retardants, antistatic agents, blowing agents and the like, such as the materials listed below, or mixtures thereof.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-mehtylheptadec-1'-yl) phenol, 2,4-dimethyl-6-(1'methyltridec-1'yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methyl-benzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxy-benzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl) dicyclopentadiene bis[2-(3'-tert-butyl-2'-hydroxy-5'-methyl-benzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy-benzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-do-decylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl) 1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3 -tert-butyl 4-hydroxy-5-methylphenyl)propionyloxy}-1,1-dimethylethyl]-2,4,8,10-tetraoxaspiro[5.5]-undecane.

1.15. Esters of β-(3.5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3.5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3.5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4- isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyidiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and di-alkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene.

2. UV absorbers and light stabilizers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl) benzotriazole, 2-(5'-2'-hydroxyphenyl) benzotriazole 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxy-phenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole- 2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethyl-butyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris (2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino) ethane, the condensate of 2-chloro-4,6-di-(4-n-butylamino-1,2,2,6,6-pentamethyl-piperidyl)-1,3,5-triazine and 1,2-bis (3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexyl-amino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96- 6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-71); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

The sterically hindered amine may also be one of the compounds described in GB-A-2 301 106 as component I-a), I-b), I-c), I-d), I-e), I-f), I-g), I-h), I-i), I-j), I-k) or I-l), in particular the light stabilizer 1-a-1,1-a-2,1-b-1,1-c-1,1-c-2,1-d-1,1-d-2,1-d-3,1-e-1,1-f-1, 1-g-1,1-g-2 or 1-k-1 listed on pages 68 to 73 of said GB-A-2 301 106.

The sterically hindered amine may also be one of the compounds described in EP-A-0 782 994, for example compounds as described in claims 10 or 38 or in Examples 1-12 or D-1 to D-5 therein.

2.7. Sterically hindered amines substituted on the N-atom by a hydroxy-substituted alkoxy group, for example compounds such as 1-(2-hydroxy-2-methylpropoxy)-4-octadecanoyloxy-2,2,6,6-tetramethylpiperidine, 1-(2-hydroxy-2-methylpropoxy)-4-hexadecanoyloxy-2,2,6,6-tetramethylpiperidine, the reaction product of 1-oxyl-4-hydroxy-2,2,6,6-tetramethylpiperidine with a carbon radical from t-amylalcohol, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl) sebacate, bis(1-(2-hydroxy-2-methylpropoxy)-2,2,6,6-tetramethylpiperidin-4-yl) adipate, bis(1-(2-hydroxy-2-methylpropoxy)-2,2,6,6-tetramethylpiperidin-4-yl) succinate, bis(1-(2-hydroxy-2-methylpropoxy)-2,2,6,6-tetramethylpiperidin-4-yl) glutarate and 2,4-bis{N-[1-(2-hydroxy-2-methylpropoxy)-2,2,6,6-tetramethylpiperidin-4-yl]-N-butylamino}-6-(2-hydroxyethylamino)-s-triazine.

2.8. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.9. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1, 3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-(2-hydroxy-4-[3-(2-ethylhexyl-1-oxy)-2-hydroxypropyloxy]phenyl]-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazine, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8, 10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:
Tris(2,4-di-tert-butylphenyl) phosphite (Irgafos®168, Ciba Specialty Chemicals Inc.), tris(nonylphenyl) phosphite,

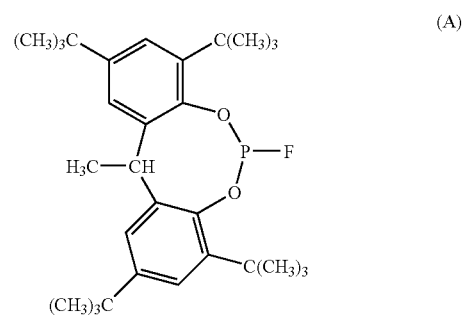
(A)

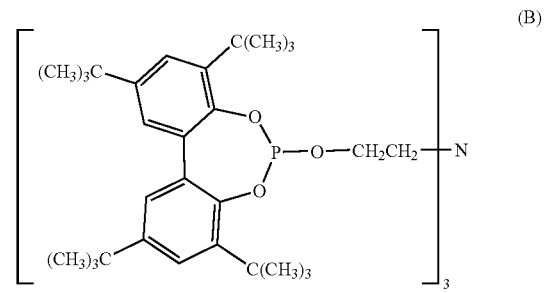
(B)

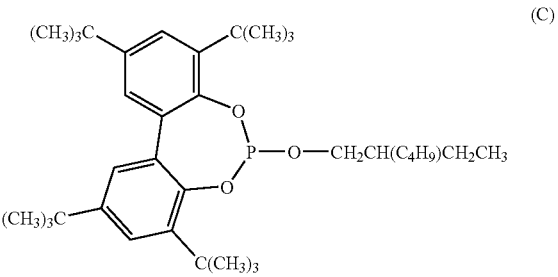
(C)

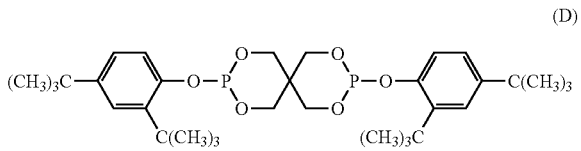
(D)

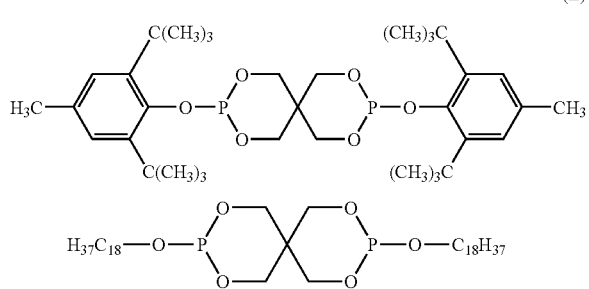
(E)

(F)

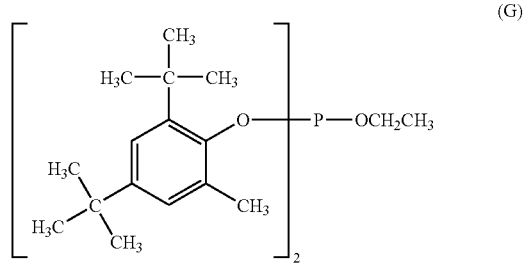
(G)

5. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

6. Thiosynergists, for example dilauryl thiodipropionate or distearyl thiodipropionate.

7. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

8. Polyamide stabilizers, for example copper salts in combination with iodides and/or phosphorus compounds and salts of divalent manganese.

9. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

10. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

11. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

12. Dispersing agents, such as polyethylene oxide waxes or mineral oil.

13. Other additives, for example plasticisers, lubricants, emulsifiers, pigments, dyes, rheology additives, catalysts, flow-control agents, optical brighteners, slip agents, crosslinking agents, crosslinking boosters, halogen scavengers, smoke inhibitors, flameproofing agents, antistatic agents, clarifiers such as substituted and unsubstituted bisbenzylidene sorbitols, benzoxazinone UV absorbers such as 2,2'-p-phenylene-bis(3,1-benzoxazin-4-one), Cyasorb® 3638 (CAS# 18600–59–4), and blowing agents.

It is also contemplated that the present polyester compositions may be further stabilized against the formation of aldehydic contaminants during melt processing with the incorporation therein of poly(vinyl alcohol), ethylene/vinyl alcohol copolymer, polyhydric alcohols, polyacrylamide, polymethacrylamide or an acrylamide or methacrylamide copolymer with at least one ethylenically unsubstituted comonomer.

Accordingly, the present invention also pertains to a polyester composition, stabilized against the formation of aldehydic contaminants during melt processing of said composition, which comprises (a) a polyester, and (b) an effective stabilizing amount of at least one polymer or copolymer derived from at least one 2-propenoic acid ester monomer of the formula I

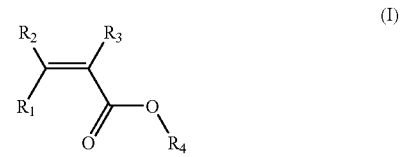

where $R_1$, $R_2$ and $R_3$ are independently hydrogen, straight or branched chain alkyl of 1 to 24 carbon atoms, cycloalkyl of 5 to 12 carbon atoms, aralkyl of 7 to 15 carbon atoms, or said alkyl, cycloalkyl or aralkyl which is further substituted by one or more —$OR_5$, —$NR_6R_7$, —$CO_2R_8$ or —$CONR_9R_{10}$ wherein $R_5$, $R_6$, $R_7$, $R_8$, $R_9$, and $R_{10}$ are independently hydrogen or straight or branched chain alkyl of 1 to 18 carbon atoms; or $R_1$, $R_2$, $R_3$ are independently a group —$CO_2R_4$, $R_4$ is a polyhydric alcohol substituent of the formula —E—(OH)$_n$ where n is 2 to 4000, and E is a hydrocarbylene moiety; and optionally (c) an effective stabilizing amount of a polymer which is poly(vinyl alcohol) or an ethylene/vinyl alcohol copolymer; and optionally (d) an effective stabilizing amount of a polyhydric alcohol; and optionally (e) an effective stabilizing amount of a polymer which is polyacrylamide, polymethacrylamide or an acrylamide or methacrylamide copolymer with at least one ethylenically unsubstituted comonomer, wherein the polyhydric alcohol is of the formula G—(OH)$_n$ where n is 2 to 4000, and G is a hydrocarbyl moiety; and optionally (f) an effective stabilizing amount of at least one compound selected from the group consisting of
  i.) hydroxylamine stabilizers,
  ii.) substituted hydroxylamine stabilizers,
  iii.) nitrone stabilizers, and
  iv.) amine oxide stabilizers.

A hydrocarbyl moiety according to this invention is for example an aliphatic, cycloaliphatic, aromatic or a mono-, di- or poly-saccharide moiety.

The hydrocarbyl moieties for the definition of G may be interrupted by heteroatoms, for example by —O—.

Polyhydric alcohols of component (d) may be for example glycerin, 1,2,3-butanetriol, 1,2,4-butanetriol, erythritol, ribitol, xylitol, dulcitol, sorbitol, 1,2,3-cyclohexatriol, inositol, glucose, galactose, mannose, galacturonic acid, xylose, glucosamine, galactosamine, 1,1,2,2-tetra-methyloylcyclohexane, 1,1,1-trimethylolpropane, 1,1,2-trimethyloylpropane, 1,1,1-trimethylol-butane, 1,1,2-trimethylolbutane, 1,1,1-trimethylpentane, 1,1,2-trimethylolpentane, 1,2,2-trimethylolpentane, trimethylolpentane, pentaerythritol, dipentaerythritol, 1,1,3,3-tetrahydroxypropane, 1,1,5,5-tetrahydroxypentane, 2,2,6,6-tetrakis(hydroxymethyl) cyclohexane and 2,2,6,6-tetrakis(hydroxymethyl) cyclohexanol.

The polyhydric alcohol is for instance starch, cellulose or a sugar or a sugar alcohol.

The polyhydric alcohols include degraded starch (dextrins and cyclodextrins), maltose and its derivatives, maltitol, maltopentaose hydrate, maltoheptaose, maltotetraose, maltulose monohydrate, D,L-glucose, dextrose, sucrose and D-mannitol.

Commercial polyhydric alcohols include trimethylol propane, triethylol propane, glycerol, sorbitol and pentaerythritol.

The hydroxylamine stabilizers, substituted hydroxylamine stabilizers, nitrone stabilizers, and amine oxide stabilizers are known in the literature.

Specific examples of compounds of component (f) are the N,N-di(alkyl)hydroxylamine produced by the direct oxidation of N,N-di(hydrogenated tallow)amine (Irgastab® FS-042), O-allyl-N,N-dioctadecylhydroxylamine, N-octadecyl-α-heptadecylnitrone, and Genox™ EP, a di-($C_{16}$–$C_{18}$) alkyl methyl amine oxide, CAS# 204933-93-7.

Irgastab® FS-042 is available from Ciba Specialty Chemicals. Genox™ EP is available from GE Chemicals. O-allyl-N,N-dioctadecylhydroxylamine is as prepared in Example 3 of U.S. Pat. No. 5,045,583. N-octadecyl-α-heptadecylnitrone is as prepared in Example 3 of U.S. Pat. No. 4,898,901.

The polyester of component (a) is 95–99.99% by weight and the polymer of component (c) is 5 to 0.01% by weight, based on the total weight of (a) and (c).

Preferably, the polyester of component (a) is 99.925–99.995% by weight and component (c) is 0.075 to 0.005% by weight based on the total weight of components (a) and (c).

The polyester of component (a) is 95–99.99% by weight and the polyhydric alcohol of component (d) is 5 to 0.01% by weight, based on the total weight of (a) and (d). Preferably, component (a) is 98–99.99% by weight and component (d) is 2 to 0.01% by weight of the total weight of (a) and (d); most preferably component (a) is 99 to 99.97% by weight and component (d) is 1 to 0.03% by weight of the total weight of (a) and (d).

The polyester of component (a) is 95–99.99% by weight and the polymer of component (e) is 5 to 0.01% by weight, based on the total weight of (a) and (e).

The polyester of component (a) is 95–99.99% by weight and the stabilizer or stabilizers of component (f), in total, are 5 to 0.01% by weight, based on the total weight of (a) and (f).

Preferably, component (a) is 98–99.99% by weight and component (f) is 2 to 0.01% by weight of the total of (a) and (f); most preferably component (a) is 99 to 99.97% by weight and component (f) is 1 to 0.03% by weight, based on the total weight of (a) and (f).

A preferred embodiment of the present invention is the use of component (b) for preventing the formation of aldehydic contaminants during melt processing of a polyester.

The following examples are for illustrative purposes only and are not to be construed to limit the scope of the instant invention in any manner whatsoever.

General—PET bottle grade pellets are subjected to extrusion compounding to simulate the heat history which PET experiences when thermally injection molded into bottle preforms and subsequently stretch-blow molded into bottles.

The efficacy of an additive added to reduce the formation of acetaldehyde is determined by quantitative analysis using thermal desorption GC-MS or GC-FID after adoption of published methods. An unstabilized PET is extruded each day to provide a control polymer for measuring acetaldehyde formation.

Extrusion —PET is pre-dried in vacuo under nitrogen at an oven temperature of about 70° C. to a moisture level of about 30 ppm which is verified on a Mitsubishi VA-06 moisturemeter. A Leistritz 18 mm or 27 mm co-rotating, non-intermeshing twin screw extruder is configured as follows: set temps=throat (220–230° C.), zones and die (270° C.), actual extrudate melt temperature is 275–280° C., screw at 100–110 rpm, hopper feeder=10–15 ppm.

PET Pellet Color—Yellowness Index (YI), and L*, a*, b* by ASTM D1925, D65 10 degm specular included, measured on PET pellets using a DCI spectrophotometer.

Acetaldehyde Analysis—The concentration of acetaldehyde in PET is quantitatively determined using a thermal desorption GC-MS method adapted from B. Nijassen et al., Packaging Technology and Science, 9,175 (1996); S. Yong Lee, SPE ANTEC 1997, pp 857–861; and M. Dong et al., J. Chromatographic Science, 18, 242 (1980). A general example follows below:

The PET samples are analyzed, in duplicate, by weighing 250 mg of powdered PET pellets (cryogenically pulverized) in a 5 mL crimp sealed headspace vial. The sample vial is heated at 120° C. for one hour in a Tekmar model 5000 static headspace analyzer. The headspace gas (5 cc) is then transferred via a heated transfer line to a Fisons MD-800 GC-MS system for SIR detection of the acetaldehyde. The acetaldehyde is detected by monitoring its fragment ions of 29 and 44 m/e. The Total Ion Current (TIC) of the GC-MS is also monitored in the retention time region of 4–8 minutes. By doing this the presence of acetaldehyde in the samples is confirmed by three different detectors. Alternatively, a GC equipped with a flame ionization detector (FID) is used in place of the GC-MS system. By using a known acetaldehyde value for PET, the ratio of peak areas for the known PET resin and for the experimental PET resin blends are compared and the amount of acetaldehyde in the experimental blend can be obtained.

EXAMPLE 1

Preparation of Glycerol Mono-Methacrylate

The title compound is prepared by the method of M. Macret and G. Hild; Polymer, vol. 23, p. 81–90,1982.

Into a two phase mixture of 86 g (0.6 mol) of comercial glycidylmethacrylate containing 200 ppm of MEHQ and 500 ml of water is added 2 ml of concentrated sulfuric acid at ambient temperature. After stirring approximately 18 hours, the mixture appeared as a clear homogenous solution. To the resultant solution is added sufficient sodium sulfate to cause separation of an oil. The 2 phase mixture is extracted sequentially with 5 portions of 150 ml each of chloroform and the combined chloroform extracts are dried over solid sodium sulfate. After filtering the solid sodium sulfate, the solvent is removed by evaporation to give 77 g (80%) of glycerol mono-methacrylate as a clear colorless oil. The monomer can be used without further purification or can be further purified by chromatography to separate trace amounts of glycerol di-methacrylate.

EXAMPLE 2

Preparation of Poly(Glyceryl Methacrylate)

Into a solution of 8.4 g (0.05 mol) of glycerol monomethacrylate of Example 1 in 40 ml of chlorobenzene is added 160 mg (1 mmol) of 2,2'-azobis(2-methylpropionitrile). The resultant solution is purged with nitrogen and heated under nitrogen at 65° C. for 15 minutes. The white suspension is cooled to ambient temperature and the white solid is isolated by filtration and dried to give 6.2 g (74%) of poly(glyceryl methacrylate).

EXAMPLE 3

Preparation of Poly(Glyceryl Methacrylate).

Into a solution of 10.8 g (0.07 mol) of glycerol monomethacrylate of Example 1 (purified by chromatography on silica gel using 3 parts ethyl acetate and 2 parts hexane solvent) in 160 ml of tetrahydrofuran is added 0.33 g (2 mmol) of 2,2'-azobis(2-methylpropionitrile). The resultant solution is purged with nitrogen and heated under nitrogen at 60° C. for 8 hours. The white suspension is cooled to ambient temperature and the white solid is isolated by filtration and dried to give 8.5 g (79%) of poly(glyceryl methacrylate). Molecular weight analysis is determined for the sample using a Pi aquagel-OH 30 GPC column, 8 micron, using 0.5M sodium chloride solution. The number average molecular weight is estimated to be 857 Daltons and the weight average molecular weight is estimated to be 891 Daltons by comparison of retention times of standards of polyethyleneglycols of known molecular weight.

EXAMPLE 4

Preparation of Random Co-Polymer Of Glycerol Mono Methacrylate and Methacrylamide.

Into a solution of 30 g (0.19 mol) of glycerol monomethacrylate of Example 1 and 15.9 g (0,19 mol) of commercial methacrylic amide in 250 ml of methanol is added 1 g (6 mmol) of 2,2'-azobis(2-methylpropionitrile). The resultant solution is purged with nitrogen and heated under nitrogen at 60° C. for 6 hours. The white suspension is cooled to ambient temperature and the white solid is isolated by filtration and dried to give 41 g (89%) of random co-polymer of glycerol mono methacrylate and methacrylamide.

EXAMPLE 5

Preparation of Random Co-Polymer of Glycerol Mono Methacrylate and Methyl Methacrylate.

Into a solution of 40 g (0.25 mol) of glycerol monomethacrylate of Example 1 and 7.5 g (0.07 mol) of commercial methyl methacrylate in 200 ml of ethyl acetate is added 1 g (6 mmol) of 2,2'-azobis(2-methylpropionitrile). The resultant solution is purged with nitrogen and heated under nitrogen at 65° C. for 8 hours. The white suspension is cooled to ambient temperature and the white solid is isolated by filtration and dried to give 41 g (97%) of random co-polymer of glycerol mono methacrylate and methyl methacrylate.

EXAMPLE 6

Preparation of Random Co-polymer of Glycerol Mono Methacrylate and 2-hydroxy-propyl Methacrylate.

Into a solution of 30 g (0.19 mol) of glycerol monomethacrylate of Example 1 and 27 g (0.19 mol) of commercial 2-hydroxypropyl methacrylate in 300 ml of ethyl acetate is added 1 g (6 mmol) of 2,2'-azobis(2-methylpropionitrile). The resultant solution is purged with nitrogen and heated under nitrogen at 60° C. for 7 hours. The white suspension is cooled to ambient temperature and the white solid is isolated by filtration and dried to give 52 g (91%) of random co-polymer of glycerol mono methacrylate and 2-hydroxypropyl methacrylate.

EXAMPLE 7

Preparation of Random Co-polymer of Glycerol Mono Methacrylate and 2-hydroxy-ethyl Methacrylate.

Into a solution of 30 g (0.19 mol) of glycerol monomethacrylate of Example 1 and 24.73 g (0.19 mol) of commercial 2-hydroxyethyl methacrylate in 300 ml of ethyl acetate is added 1 g (6 mmol) of 2,2'-azobis(2-methylpropionitrile). The resultant solution is purged with nitrogen and heated under nitrogen at 60° C. for 6 hours. The white suspension is cooled to ambient temperature and the white solid is isolated by filtration and dried to give 52 g (95%) of random co-polymer of glycerol mono methacrylate and 2-hydroxyethyl methacrylate.

EXAMPLE 8

Preparation of Random Co-Polymer of Glycerol Mono-Methacrylate and Styrene.

Into a solution of 32.03 g (0.2 mol) of glycerol monomethacrylate of Example 1 and 20.8 g (0.2 mol) of commercial styrene in 200 ml of ethyl acetate is added 2 g (12 mmol) of 2,2'-azobis(2-methylpropionitrile). The resultant solution is purged with nitrogen and heated under nitrogen at 75° C. for 2 hours. The white suspension is cooled to ambient temperature and the white solid is isolated by filtration and dried to give 33.7 g (64%) of random co-polymer of glycerol mono methacrylate and styrene.

EXAMPLE 9

Preparation of random co-polymer of glycerol mono-methacrylate and styrene.

Into a solution of 22.7 g (0.14 mol) of glycerol monomethacrylate of Example 1 (purified by chromatography on silica gel using 3 parts ethyl acetate and 2 parts hexane solvent) and 14.5 g (0.14 mol) of distilled styrene free of storage stabilizer in 600 ml of tetrahydrofuran is added 1.5 g (9 mmol) of 2,2'-azobis(2-methylpropionitrile). The resultant solution is purged with nitrogen and heated under nitrogen at 65° C. for 15 hours, then cooled and the solvent removed by distillation under vacuum. The resultant oil is poured into 600 ml of ethyl acetate to precipitate the polymer. The white solid is isolated by filtration and dried to give 12.4 g (33%) of random co-polymer of glycerol mono methacrylate and styrene. Molecular weight analysis is determined for the sample using a PI gel, 3 micron, Mixed-E (2)GPC column, using tetrahydrofuran mobile phase. The number average molecular weight is estimated to be 4841 Daltons and the weight average molecular weight is esti-

EXAMPLE 10

Stabilization of Poly(Ethylene Terephthalate) (PET).

Unstabilized commercial PET (CLEARTUF® 7207, Shell) is used as a control PET. Poly(glyceryl methacrylate) of Example 2 provides significant reduction in the amount of acetaldehyde (AA) versus the amount seen when unstabilized PET is extrusion compounded. The % AA reduction is the amount less compared to the amount of M in the control, all measured by GC-FID.

| Formulation | Additive | Additive Level (ppm) | % AA Reduction | GCFID avg. ppm AA |
|---|---|---|---|---|
| Control | — | none | — | 2.58 |
| A | Example 2 | 5000 | 34 | 1.70 |

It is seen that the poly(glyceryl methacrylate) additive of the present invention provides significant reduction of acetaldehyde versus the control in PET without any undesireable side effects.

EXAMPLE 11

Stabilization of Poly(Ethylene Terephthalate) (PET)

Unstabilized commercial PET (CLEARTUF® 8006, Shell) is used as a control PET. Co-polymers of Examples 4–6 provide significant reduction in the amount of acetaldehyde (M) versus the amount seen when unstabilized PET is extrusion compounded. The % AA reduction is the amount less compared to the amount of AA in the control, all measured by GC-FID.

| Formulation | Additive | Additive Level (ppm) | % AA Reduction | GCFID avg. ppm AA |
|---|---|---|---|---|
| Control | — | none | — | 2.13 |
| B | Example 4 | 7500 | 61.5 | 0.82 |
| C | Example 5 | 7500 | 26.8 | 1.56 |
| D | Example 6 | 7500 | 13.1 | 1.85 |
| E | Example 6 | 15000 | 25.4 | 1.59 |

It is seen that the poly(glyceryl methacrylate) co-polymers of the present invention provide significant reduction of acetaldehyde versus the control in PET.

EXAMPLE 12

Stabilization of poly(ethylene terephthalate) (PET).

Unstabilized commercial PET (CLEARTUF 8006, Shell) is used as a control PET. Co-polymers of Examples 4–6 provide significant reduction in the amount of acetaldehyde (AA) versus the amount seen when unstabilized PET is extrusion compounded. The % AA reduction is the amount less compared to the amount of M in the control, all measured by GC-FID.

| Formulation | Additive | Additive Level (ppm) | % AA Reduction | GCFID avg. ppm AA |
|---|---|---|---|---|
| Control | — | none | — | 3.66 |
| F | Example 2 | 2500 | 31 | 2.53 |
| G | Example 2 | 10000 | 36 | 2.34 |
| H | Example 9 | 2500 | 31 | 2.53 |
| J | Example 9 | 10000 | 19 | 2.97 |

It is seen that the poly(glyceryl methacrylate) and the random co-polymer of glycerol mono methacrylate and styrene of the present invention provide significant reduction of acetaldehyde versus the control in PET without adversely effecting the color or clarity of the PET.

EXAMPLE 13

Stabilization of Poly(Ethylene Terephthalate) (PET).

Examples 10–12 are repeated with the further inclusion of polyols selected from the group consisting of pentaerythritol, dipentaerythritol and trimethylolpropane. The co-use of the poly-(glyceryl methacrylate) polymers and copolymers of this invention and a polyol provides significant reduction of acetaldehyde vs. a control sample of PET without any undesirable side effects.

EXAMPLE 14

Stabilization of Poly(Ethylene Terephthalate) (PET).

Examples 10–12 are repeated with the further inclusion of additives selected from the group consisting of the N,N-di(alkyl)hydroxylamine produced by the direct oxidation of N,N-di-(hydrogenated tallow)amine (Irgastab® FS-042), O-allyl-N,N-dioctadecylhydroxylamine, N-octadecyl-a-heptadecylnitrone, and Genox™ EP, a di($C_{16}$–$C_{18}$)alkyl methyl amine oxide, CAS# 204933-93-7. The co-use of the poly(glyceryl methacrylate) polymers and copolymers of this invention and an additional additive as above provides significant reduction of acetaldehyde vs. a control sample of PET without any undesirable side effects.

What is claimed is:

1. A polyester composition, stabilized against the formation of aldehydic contaminants during melt processing of said composition, which comprises
    (a) a polyester, and
    (b) an effective stabilizing amount of at least one polymer or copolymer derived from at least one 2-propenoic acid ester monomer of the formula I

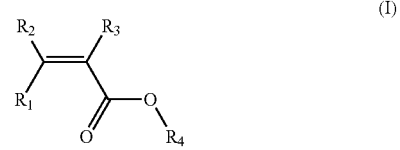

where $R_1$, $R_2$ and $R_3$ are independently hydrogen, straight or branched chain alkyl of 1 to 24 carbon atoms, cycloalkyl of 5 to 12 carbon atoms, aralkyl of 7 to 15 carbon atoms, or said alkyl, cycloalkyl or aralkyl which is further substituted by one or more —$OR_5$, —$NR_6R_7$, —$CO_2R_8$ or —$CONR_9R_{10}$ wherein $R_5$, $R_6$, $R_7$, $R_8$, $R_9$, and $R_{10}$ are independently hydrogen or straight or branched chain alkyl of 1 to 18 carbon atoms; or $R_1$, $R_2$, $R_3$ are independently a group —$CO_2R_4$, $R_4$ is a polyhydric alcohol substituent of the formula —E—(OH)$_n$ where n is 2 to 4000, and E is a hydrocarbylene moiety.

2. A composition according to claim 1 wherein the polyester of component (a) is 95–99.99 % by weight and the stabilizers of component (b), in total, are 5 to 0.01 % by weight, based on the total weight of (a) and (b).

3. A composition according to claim 1 wherein the polyester of component (a) is poly(ethylene terephthalate) or poly(ethylene 2,6-naphthalene-2,6-dicarboxylate).

4. A composition according to claim 1 in which component (b) is at least one polymer or copolymer selected from the group consisting of poly(glyceryl methacrylate) homopolymer and copolymers of 2-propenoic acid, 2-methyl-, 2,3-dihydroxypropyl ester with one or more other ethylenically unsaturated monomers.

5. A composition according to claim 4 in which the other ethylenically unsaturated monomer is selected from the group consisting of 2-hydroxyethylmethacrylate, 2-hydroxypropylmethacrylate, methacrylamide, styrene and methyl methacrylate.

6. A composition according to claim 4 in which component (b) is poly(glyceryl methacrylate) homopolymer.

7. A mono- or multi-layered plastic container or film, stabilized against the formation of aldehydic contaminants during melt processing of said container or film, comprising at least one layer which comprises (a) a polyester, and (b) an effective stabilizing amount of at least one polymer or copolymer derived from at least one 2-propenoic acid ester monomer of the formula I

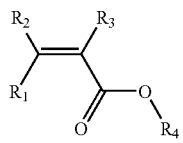

where $R_1$, $R_2$ and $R_3$ are independently hydrogen, straight or branched chain alkyl of 1 to 24 carbon atoms, cycloalkyl of 5 to 12 carbon atoms, aralkyl of 7 to 15 carbon atoms, or said alkyl, cycloalkyl or aralkyl which is further substituted by one or more —$OR_5$, —$NR_6R_7$, —$CO_2R_8$ or —$CONR_9R_{10}$ wherein $R_5$, $R_6$, $R_7$, $R_8$, $R_9$, and $R_{10}$ are independently hydrogen or straight or branched chain alkyl of 1 to 18 carbon atoms; or $R_1$, $R_2$, $R_3$ are independently a group —$CO_2R_4$, $R_4$ is a polyhydric alcohol substituent of the formula —E—(OH)$_n$ where n is 2 to 4000, and E is a hydrocarbylene moiety.

8. A plastic container according to claim 7 which is a rigid bottle.

9. A process for preventing the formation of aldehydic contaminants during melt processing of a polyester which comprises incorporating into said polyester an effective stabilizing amount of at least one polymer or copolymer derived from at least one 2-propenoic acid ester monomer of the formula I

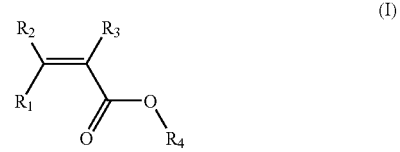

where $R_1$, $R_2$ and $R_3$ are independently hydrogen, straight or branched chain alkyl of 1 to 24 carbon atoms, cycloalkyl of 5 to 12 carbon atoms, aralkyl of 7 to 15 carbon atoms, or said alkyl, cycloalkyl or aralkyl which is further substituted by one or more —$OR_5$, —$NR_6R_7$, —$CO_2R_8$ or —$CONR_9R_{10}$ wherein $R_5$, $R_6$, $R_7$, $R_8$, $R_9$, and $R_{10}$ are independently hydrogen or straight or branched chain alkyl of 1 to 18 carbon atoms; or $R_1$, $R_2$, $R_3$ are independently a group —$CO_2R_4$, $R_4$ is a polyhydric alcohol substituent of the formula —E—(OH)$_n$ where n is 2 to 4000, and E is a hydrocarbylene moiety.

10. A polyester composition, stabilized against the formation of aldehydic contaminants during melt processing of said composition, which comprises (a) a polyester, and (b) an effective stabilizing amount of at least one polymer or copolymer derived from at least one 2-propenoic acid ester monomer of the formula I

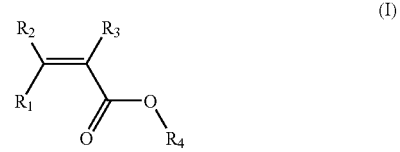

where $R_1$, $R_2$ and $R_3$ are independently hydrogen, straight or branched chain alkyl of 1 to 24 carbon atoms, cycloalkyl of 5 to 12 carbon atoms, aralkyl of 7 to 15 carbon atoms, or said alkyl, cycloalkyl or aralkyl which is further substituted by one or more —$OR_5$, —$NR_6R_7$, —$CO_2R_8$ or —$CONR_9R_{10}$ wherein $R_5$, $R_6$, $R_7$, $R_8$, $R_9$, and $R_{10}$ are independently hydrogen or straight or branched chain alkyl of 1 to 18 carbon atoms; or $R_1$, $R_2$, $R_3$ are independently a group —$CO_2R_4$, $R_4$ is a polyhydric alcohol substituent of the formula —E—(OH)$_n$ where n is 2 to 4000, and E is a hydrocarbylene moiety; and optionally (c) an effective stabilizing amount of a polymer which is poly(vinyl alcohol) or an ethylene/vinyl alcohol copolymer; and optionally (d) an effective stabilizing amount of a polyhydric alcohol; and optionally (e) an effective stabilizing amount of a polymer which is polyacrylamide, polymethacrylamide or an acrylamide or methacrylamide copolymer with at least one ethylenically unsubstituted comonomer, wherein the polyhydric alcohol is of the formula G—(OH)$_n$ where n is 2 to 4000, and G is a hydrocarbyl moiety; and optionally (f) an effective stabilizing amount of at least one compound selected from the group consisting of
 i.) hydroxylamine stabilizers,
 ii.) substituted hydroxylamine stabilizers,
 iii.) nitrone stabilizers, and
 iv.) amine oxide stabilizers.

* * * * *

UNITED STATES PATENT AND TRADEMARK OFFICE
CERTIFICATE OF CORRECTION

| | | |
|---|---|---|
| PATENT NO. | : 7,138,457 B2 | Page 1 of 1 |
| APPLICATION NO. | : 10/485378 | |
| DATED | : November 21, 2006 | |
| INVENTOR(S) | : Paul Angelo Odorisio et al. | |

It is certified that error appears in the above-identified patent and that said Letters Patent is hereby corrected as shown below:

<u>Title page</u>

Insert Item [60], it should read:

-- [60]      Related U.S. Application Data

Provisional Application No, 60/312,012, filed on August 13, 2001. --.

Signed and Sealed this

Eighteenth Day of September, 2007

JON W. DUDAS
*Director of the United States Patent and Trademark Office*